Sept. 10, 1946.　　　J. D. FARRIES　　　2,407,409
NONFRICTION BEARING BALL DISPENSER
Filed Dec. 8, 1944　　2 Sheets-Sheet 1
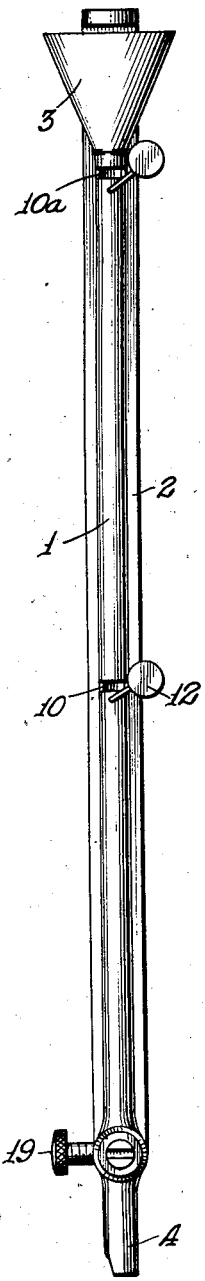
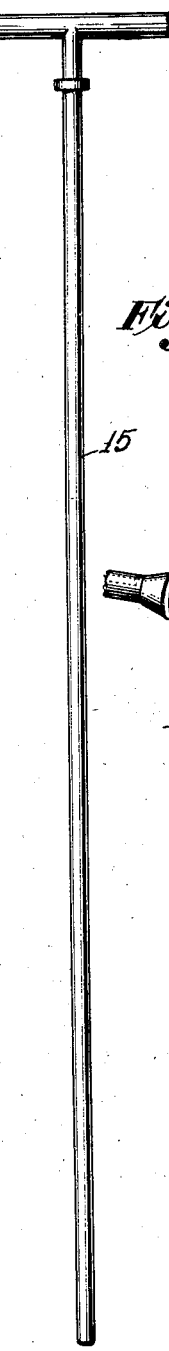
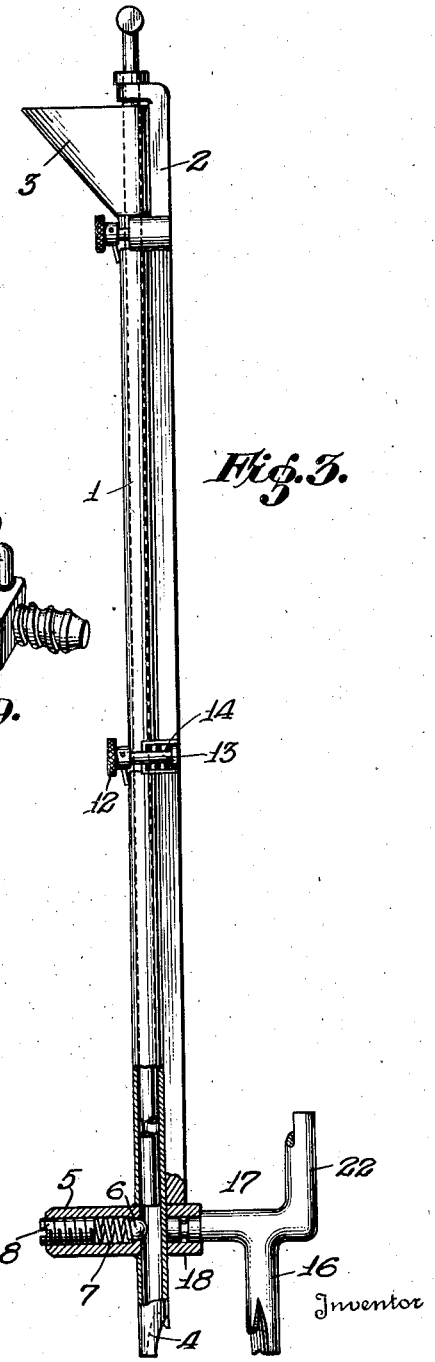
Jack D. Farries
By Almon S. Nelson
Attorney Sept. 10, 1946.  J. D. FARRIES  2,407,409
NONFRICTION BEARING BALL DISPENSER
Filed Dec. 8, 1944  2 Sheets-Sheet 2
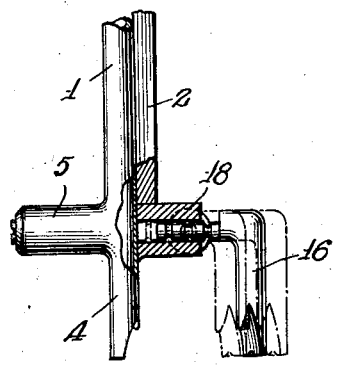
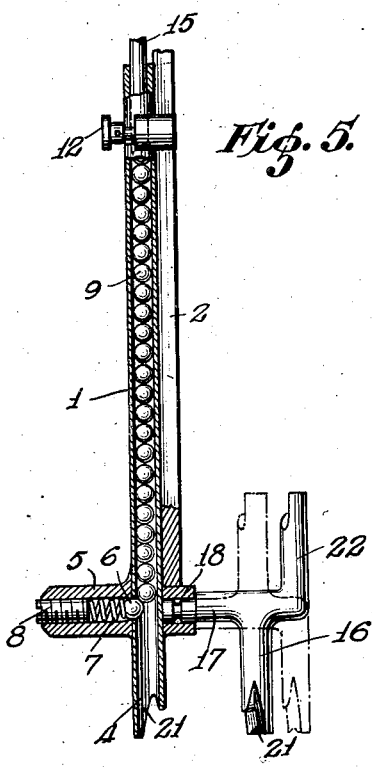
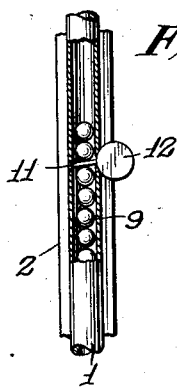
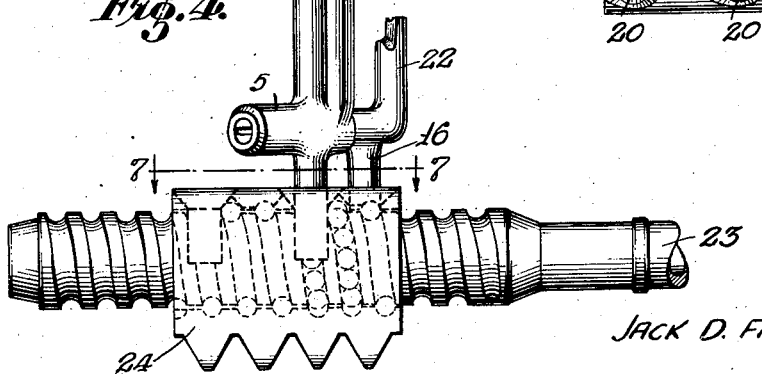
Inventor
JACK D. FARRIES
By Almon S. Nelson
Attorney Patented Sept. 10, 1946

2,407,409

UNITED STATES PATENT OFFICE 2,407,409

NONFRICTION BEARING BALL DISPENSER

Jack D. Farries, Petersburg, Va.

Application December 8, 1944, Serial No. 567,275

6 Claims. (Cl. 29—201)

The invention relates to bearing ball dispensing apparatus of the type employed to charge non-friction bearing members into a raceway or like ball-receiving circuit.

The dispenser to which the invention applies in particular has utility in feeding the bearing balls in worm shaft and nut assemblies conventional in automotive steering gear mechanisms but is not limited, within the purview of this invention, to a specific bearing assembly.

An object of the invention is to provide a dispenser which will insure delivery of bearing balls in correct amount to the ball-receiving circuit.

Another object is to provide a dispenser which will insure safe disposition of the balls within the circuit.

Another object is to provide a dispenser which will be simple in operation and can be readily and economically manufactured.

According to the invention the dispenser has a tubular magazine provided with visual indicia to apprise the operator that the magazine is charged with balls in correct amount, means being associated with the indicia to permit removal from the magazine of an excess of balls. The magazine has communication with the ball-receiving circuit at one end thereof to charge the balls thereinto and a plug, insertible in the other end of the circuit, may be connected to the magazine to prevent ejection of the balls from the circuit during the charging operation.

The invention is exemplified in dispensing apparatus shown in the accompanying drawings in which the views are as follows:

Fig. 1 is a front elevation of a dispenser to which the invention is applicable;

Fig. 2, an elevation of the push-rod employed to impel the balls from the magazine;

Fig. 3, a side elevation, partially in section, of the dispensing apparatus;

Fig. 4, an elevational view of a worm shaft and nut assembly with the dispenser, partially broken away, in operative application thereto;

Fig. 5, an elevation, partially in section, of the magazine and plug attachment thereto;

Fig. 6, a fragmentary view of the stop means for restraining the balls in the magazine;

Fig. 7, a plan view, taken from the line 7—7, of the worm nut shown in Fig. 4;

Fig. 8, a vertical section through the attachment of the plug to the magazine;

Fig. 9, a perspective view of the worm nut with guide members inserted therein.

It will be understood that the worm shaft and nut assembly herein described does not form a part of the invention but is depicted as a nonfriction bearing assembly with which the dispensing apparatus has utility and in respect to which it will hereinafter be exemplified. Such bearing assemblies have one or more ball-receiving channels or circuits. Each circuit conforms to the helix generated along the grooves of the worm shaft, as shown in Fig. 4, and when filled with non-friction bearing balls in correct amount, forms the bearing between the shaft 23 and nut 24 during the relative rotation of these members in operation of the steering column of which they are a part.

An essential requirement of the bearing assembly is that each circuit thereof shall function separately from the circuit adjacent thereto in order that the bearing balls therein may remain confined and circulate therein during rotation of the shaft and nut. To this end, each circuit in the nut terminates in a pair of guide holes 20 and 21, Fig. 7. The guide hole 20, for example, may be the inlet of the circuit of which the guide hole 21 will be the outlet. In practice, the nut is provided with U-shaped, hollow guide members 25, which are inverted and fitted into guide holes as shown in Fig. 9, whereby to isolate each circuit and provide a separate channel therein for the circulation of the balls during operation of the bearing assembly. The guide members 25 may be additionally filled with bearing balls, if required by the assembly, such additional balls usually being fed into the guide members by hand prior to insertion of the guide members into the guide holes.

The dispenser will be seen to have a normally upright tubular magazine 1, which may be carried on a frame or standard 2 to which it may be secured in any suitable manner as by welding.

The magazine 1 has a funnel shaped inlet 3 at the top thereof and terminates at the bottom in a discharge nozzle 4.

Communicating with the magazine near the bottom thereof is a poppet chamber 5, in which is carried a spherical stop member or poppet ball 6. The poppet ball is yieldingly held in place by a spring 7 upon which compression is maintained by a set screw 8, to urge the poppet ball against the bottom-most ball of a column of balls 9, stored in the magazine. Thus, the poppet ball serves to prevent the column of balls thereabove from falling out of the magazine, prematurely, during operation of the dispenser.

The magazine is slotted as at 10 at such elevation along the magazine as to disclose the topmost ball of a column of balls of pre-determined number intended for deposit in the ball-receiving circuit.

The slot 10 is provided with a stop 11 which is pivotable in and out of registration with the slot by a rotatable thumb latch having a knurled head 12 which is headed upon a stem 13 which may be journaled in the standard 2. The latch has a spring 14 by which it is urged normally inward against the magazine to restrain the top-most ball and thereby maintain the column of balls intact between the stop 11 and the poppet ball 6, prior to the discharge of the balls from the dispenser.

The dispenser has a push-rod 15, insertible in the magazine from the top thereof, to expel the column of balls from the magazine.

Spaced from the nozzle 4 and substantially parallel thereto is a plug 16 which is pivotably connected to the magazine by a rotatable stem or spindle 17. The spindle 17 is detachably held on a socket 18 which may be formed against the standard 2, a thumb-screw 19 being threaded into the socket 18 to secure the spindle against rotation or detachment.

In practice, the magazine is filled with a supply of balls the mechanic noting when the column of balls thus fed into the magazine has reached the indicating slot 10, whereby he is apprised that the correct number of balls intended for the circuit is stored within the magazine. The stop 11, which has been pivoted out of engagement with the slot during the filling of the magazine, is now moved into the slot and the dispenser is inverted to expel therefrom any excess balls which the mechanic has fed into the magazine, the stop 11 functioning to restrain the column of balls therebelow from following the excess balls out of the funnel end of the magazine when held in its inverted position.

The dispenser is then applied to the ball-receiving channel or circuit as shown in Fig. 4, the nozzle 4 being inserted in a guide hole 20 at one end of a ball-receiving circuit, and the plug 16 being fitted to a guide hole 21 at the other end of the circuit. The push rod 15 is inserted into the magazine and the column of balls intended for the circuit is rammed past the poppet ball 6 and charged into the circuit. The plug 16 serves as an abutment against which the balls disposed in the circuit are brought to rest in suitable position and prevented from being ejected out of the circuit by the force applied in manipulating the push rod 15.

The nozzle 4 and plug 16 may be counterbored in any suitable manner as at 21 to facilitate the correct relative position of the balls within the circuit.

Having charged the ball-receiving circuit, the mechanic proceeds with the assembly of the worm shaft and nut.

Thus, it will be seen that the dispenser enables rapid and safe delivery of the balls into the circuit, for, if fed into the circuit by hand, the balls may well be excessive in number through an error by the mechanic. An excess ball in the circuit may become wedged in the threaded interior of the bearing assembly to the detriment and injury of its non-friction properties.

The stem or spindle 17 may have formed thereon a plurality of plugs in any convenient number, each plug being spaced at varying distances from the nozzle 4. The drawings illustrate an additional plug 22, but other plugs, radiating out from the spindle may be formed thereon to provide a selectivity of plugs to adapt the dispenser in an obvious manner to guide holes of varying spacings. Thus, bearing assemblies of several different sizes may be accommodated by the dispenser, the mechanic simply pivoting the spindle 17 until the plug of desired spacing from the nozzle 4, is brought into operative position for insertion in its respective guide hole. It will be understood, also, that the slot 10 may be repeated along the magazine, as at 10a, to adapt the visual indicating means to a column of balls of any pre-determined number, and the slot provided with the stop and latch member shown at the slot 10.

While the invention has been exemplified in a dispenser having a frame or standard against which the magazine 1 has been shown mounted, it will be understood that the standard 2 may be omitted and the fittings whereby the stop 11, the poppet chamber 5, and/or the plug socket member 18, are connected to the dispenser may be secured, as by welding, directly to the tubular member 1. As hereinafter claimed, the term "column" refers to the column of bearing balls of pre-determined number, and the term "magazine" to the tubular structure 1, with or without the re-inforcing member, the standard 2.

While herein described as tubular in form, the magazine may embody an open rack or like elongated enclosure, disposed in a substantially upright position, for storage of the bearing balls intended to be charged into the ball-receiving channel.

Of course, the magazine has utility without the plug 16, or the modifications thereof hereinbefore described, as, for example, in feeding a raceway or circuit from one end thereof.

It will be understood that the invention is susceptible of various modifications without departing from the scope thereof as hereinafter claimed.

I claim:

1. A bearing ball dispenser comprising a tubular magazine having an inlet in the top thereof for the reception of a supply of bearing balls and an outlet in the bottom thereof for communication with a ball-receiving circuit, said magazine having an indicating slot at substantially the elevation of the top of a column of balls of predetermined number, a stop movable into said slot to restrain said column at the top thereof, a push rod insertable in said magazine to discharge said column therefrom, means associated with said magazine near the bottom thereof to support said column and yieldable to permit the passage thereof upon operative application thereto of said push rod.

2. A bearing ball dispenser comprising a tubular magazine having an inlet in the top thereof for the reception of a supply of bearing balls and an outlet in the bottom thereof for communication with the inlet of a ball-receiving circuit, said magazine having an indicating slot at substantially the elevation of the top of a column of balls of pre-determined number, a stop movable into said slot to restrain said column at the top thereof, a push rod insertable in said magazine to discharge said column therefrom in a continuous stream, means associated with said magazine near the bottom thereof to support said column and yieldable to permit the passage thereof upon operative application thereto of said push rod, a plug associated with said magazine and spaced therefrom for engagement with the terminus of said circuit to check ejection therefrom of said column.

3. A bearing ball dispenser comprising a normally upright tubular magazine having an inlet in the top thereof for the reception of a supply of bearing balls and an outlet in the bottom thereof for communication with the inlet of a ball-receiving circuit, said magazine having slotted indicia at substantially the elevation of the top of a column of bearing balls of pre-determined number, means associated with said indicia to restrain said column at the top thereof, a push rod insertable in said magazine to manually discharge therefrom said column of balls, a column support associated with said magazine near the bottom thereof and comprising a laterally disposed chamber, a stop member carried thereby and partially projecting into said magazine, a compression spring arranged in said chamber to yieldingly urge said stop member against said column at the bottom thereof and a set screw threaded in said chamber to adjustably maintain said spring in compression.

4. A bearing ball dispenser comprising a normally upright tubular magazine having an inlet in the top thereof for the reception of a supply of bearing balls and an outlet in the bottom thereof for communication with the inlet of a ball-receiving circuit, said magazine having slotted indicia at substantially the elevation of the top of a column of bearing balls of pre-determined number, means associated with said indicia to restrain said column at the top thereof, a push rod insertable in said magazine to manually discharge therefrom said column of balls, a column support associated with said magazine near the bottom thereof and comprising a laterally disposed chamber, a stop member carried thereby and partially projecting into said magazine, a compression spring arranged in said chamber to yieldingly urge said stop member against said column at the bottom thereof and a set screw threaded in said chamber to adjustably maintain said spring in compression, a plug associated with said magazine and spaced therefrom for engagement with the terminus of said circuit to check the ejection therefrom of said column.

5. A bearing ball dispenser comprising a normally upright tubular magazine having an inlet in the top thereof for the reception of a supply of bearing balls and an outlet in the bottom thereof for communication with the inlet of a ball-receiving circuit, said magazine having slotted indicia at substantially the elevation of the top of a column of bearing balls of pre-determined number, means associated with said indicia to restrain said column at the top thereof, a push rod insertable in said magazine to manually discharge therefrom said column of bearing balls, means associated with said magazine near the bottom thereof to support said column and yieldable to permit passage thereof upon operative application thereto of said push rod, a spindle associated with said magazine adjacent the lower end thereof, a plurality of plugs radiating therefrom and each plug being spaced at varying intervals from said magazine to effect selective accommodation of said plugs to circuit terminals of varying widths.

6. A bearing ball dispenser comprising a normally upright tubular magazine having an inlet in the top thereof for the reception of a supply of bearing balls and an outlet in the bottom thereof for communication with the inlet of a ball-receiving circuit, said magazine having slotted indicia at substantially the elevation of the top of a column of bearing balls of pre-determined number, means associated with said indicia to restrain said column at the top thereof, a push rod insertable in said magazine to manually discharge said column of balls therefrom, a column support associated with said magazine adjacent the bottom thereof and comprising a laterally disposed chamber, a stop member carried thereby and partially projecting into said magazine, a compression spring arranged in said chamber to yieldingly urge said stop member against said column at the bottom thereof and a set screw threaded in said chamber to adjustably maintain said spring in compression, a spindle associated with said magazine near the lower end thereof, a plurality of plugs radiating therefrom and each plug being spaced at varying intervals from said magazine to effect selective accommodation of said plugs to circuit terminals spaced at varying widths.

JACK D. FARRIES.